US012669640B2

(12) United States Patent
Chiu

(10) Patent No.: US 12,669,640 B2
(45) Date of Patent: Jun. 30, 2026

(54) LIGHT EMITTING MODULE

(71) Applicant: ASUSTek COMPUTER INC., Taipei City (TW)

(72) Inventor: Lin-Wei Chiu, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 46 days.

(21) Appl. No.: 18/900,926

(22) Filed: Sep. 30, 2024

(65) Prior Publication Data

US 2025/0138237 A1      May 1, 2025

(30) Foreign Application Priority Data

Nov. 1, 2023    (TW) ................................. 112142080

(51) Int. Cl.
  *G02B 6/00*        (2006.01)
  *F21V 8/00*        (2006.01)
(52) U.S. Cl.
  CPC ......... *G02B 6/0068* (2013.01); *G02B 6/0043* (2013.01); *G02B 6/0073* (2013.01)
(58) Field of Classification Search
  CPC ... G02B 6/0068; G02B 6/0043; G02B 6/0073
  See application file for complete search history.

(56) References Cited

U.S. PATENT DOCUMENTS 8,465,174 B2    6/2013  Ing et al.
10,353,135 B2   7/2019  Song et al.

| | | | | |
|---|---|---|---|---|
| 11,835,750 B1* | 12/2023 | Chiu | .................... | G02B 6/0068 |
| 2011/0157914 A1* | 6/2011 | Chang | .................. | G02B 6/0096 |
| | | | | 362/609 |
| 2013/0229828 A1* | 9/2013 | Chen | .................... | G02B 6/0076 |
| | | | | 362/616 |
| 2015/0002555 A1* | 1/2015 | Chi | ........................ | G02F 1/1345 |
| | | | | 345/690 |
| 2020/0043681 A1* | 2/2020 | Chen | ...................... | H01H 13/83 |
| 2020/0081250 A1* | 3/2020 | Mohammed | ........... | G02B 30/40 |
| 2021/0358966 A1* | 11/2021 | Li | ........................ | H10D 86/411 |
| 2022/0238763 A1* | 7/2022 | Ho | ...................... | H01L 25/0753 |
| 2024/0045130 A1* | 2/2024 | Shao | ................. | G02F 1/133626 |

FOREIGN PATENT DOCUMENTS

| | | |
|---|---|---|
| CN | 2483594 | 3/2002 |
| CN | 202093765 | 12/2011 |
| TW | 201500810 | 1/2015 |
| TW | 201727293 | 8/2017 |

* cited by examiner

*Primary Examiner* — Gerald J Sufleta, II

(74) *Attorney, Agent, or Firm* — JCIPRNET

(57) ABSTRACT

A light emitting module includes a transparent substrate, a plurality of first light emitting components, a light guide plate and a plurality of second light emitting components. The transparent substrate includes a first surface and a second surface that are opposite to each other. The plurality of first light emitting components are arranged in an array on the first surface. The light guide plate is disposed on the second surface. The plurality of second light emitting components are disposed on the second surface and face the light incident side surface of the light guide plate.

12 Claims, 5 Drawing Sheets

LIGHT EMITTING MODULE

CROSS-REFERENCE TO RELATED APPLICATION

This application claims the priority benefit of Taiwan application serial no. 112142080, filed on Nov. 1, 2023. The entirety of the above-mentioned patent application is hereby incorporated by reference herein and made a part of this specification.

BACKGROUND

Technical Field

This disclosure relates to a light emitting module.

Description of Related Art

Today, the importance of appearance design for electronic devices such as desktop computers, notebook computers, tablets, smartphones, and e-book devices continues to grow. There are also many combinations of colors, patterns, and the like for electronic device casings, and design diversity is becoming increasingly important.

For example, a light-transmitting area can be provided on the casing of an electronic device, and a light emitting component combined with a light guide plate can be used to emit a specific luminous pattern (such as a trademark (logo), etc.) below the light-transmitting area. However, this method can only present a predetermined pattern and lacks the variability of the pattern. If mini LEDs arranged in an array are used to display patterns, although a variety of patterns or text can be displayed, patterns cannot be displayed at the gaps between mini LEDs due to routing requirement. Accordingly, dark regions would be formed between mini LEDs so that high resolution images cannot be displayed by mini LEDs. Therefore, current practices remain less than ideal.

SUMMARY

The present disclosure provides a light emitting module that can display a specific luminous pattern with higher resolution and also various luminous patterns that can be switched upon preference.

A light emitting module disclosed in the present disclosure includes a transparent substrate, a plurality of first light emitting components, a light guide plate and a plurality of second light emitting components. The transparent substrate includes a first surface and a second surface that are opposite to each other. The plurality of first light emitting components are arranged in an array on the first surface. The light guide plate is disposed on the second surface. The plurality of second light emitting components are disposed on the second surface and face the light incident side surface of the light guide plate.

In an embodiment of the present disclosure, when viewed from the top view, a footprints of the plurality of first light emitting components are located within the footprint of the light guide plate.

In an embodiment of the present disclosure, when viewed from a top view, a footprint of the plurality of first light emitting components are located within a footprint of the light guide plate.

In an embodiment of the present disclosure, the light guide plate comprises a plurality of light emitting microstructures distributed over a lower surface of the light guide plate.

In an embodiment of the present disclosure, the plurality of second light emitting components are respectively disposed on two opposite sides of the light guide plate.

In an embodiment of the present disclosure, the plurality of second light emitting components are respectively disposed at a plurality of corners of the light guide plate.

In an embodiment of the present disclosure, the light emitting module further includes a reflection sheet disposed on a lower surface of the light guide plate.

In an embodiment of the present disclosure, the transparent substrate is a flexible transparent substrate.

In an embodiment of the present disclosure, the light emitting module further includes a driver chip coupled to the plurality of first light emitting components and the plurality of second light emitting components.

In an embodiment of the present disclosure, the transparent substrate comprises an active portion and a connecting portion, the plurality of first light emitting components, the plurality of second light emitting components and the light guide plate are all disposed at the active portion, and the connecting portion is connected to the active portion and coupled to the driver chip.

In an embodiment of the present disclosure, the plurality of first light emitting components comprise a plurality of mini light emitting diodes (mini LEDs) or a plurality of micro LEDs, and the plurality of second light emitting components include a plurality of LEDs.

In light of the foregoing, in the light emitting module of the present disclosure, the first light emitting components are arranged in an array on the first surface of the transparent substrate while the light guide plate and the second light emitting components on the light incident side surface of the light guide plate are disposed on the second surface of the transparent substrate. With this configuration, the light emitting module can display a variety of luminous patterns or text by driving the corresponding first light emitting components to emit light. Moreover, the light emitted by the second light emitting component enters the light guide plate and exits from the upper surface of the light guide plate, so that the light emitting module can display a specific luminous pattern or text with higher resolution by incorporating the second light emitting components and the light guide plate. Therefore, the light emitting module of the present disclosure can display either a specific luminous pattern with higher resolution or a variety of light emitting patterns that can be changed upon requests, thereby enhancing the user's visual experience and improving the appearance varieties of electronic devices using this light emitting module.

DESCRIPTION OF THE EMBODIMENTS

The present disclosure will now be described more fully with reference to the accompanying drawings, in which exemplary embodiments of the invention are shown. The terms used herein such as "on", "above", "below", "front", "back", "left" and "right" are for the purpose of describing directions in the figures only and are not intended to be limiting of the invention. Moreover, in the following embodiments, the same or similar reference numbers denote the same or like components.

Figure 1:
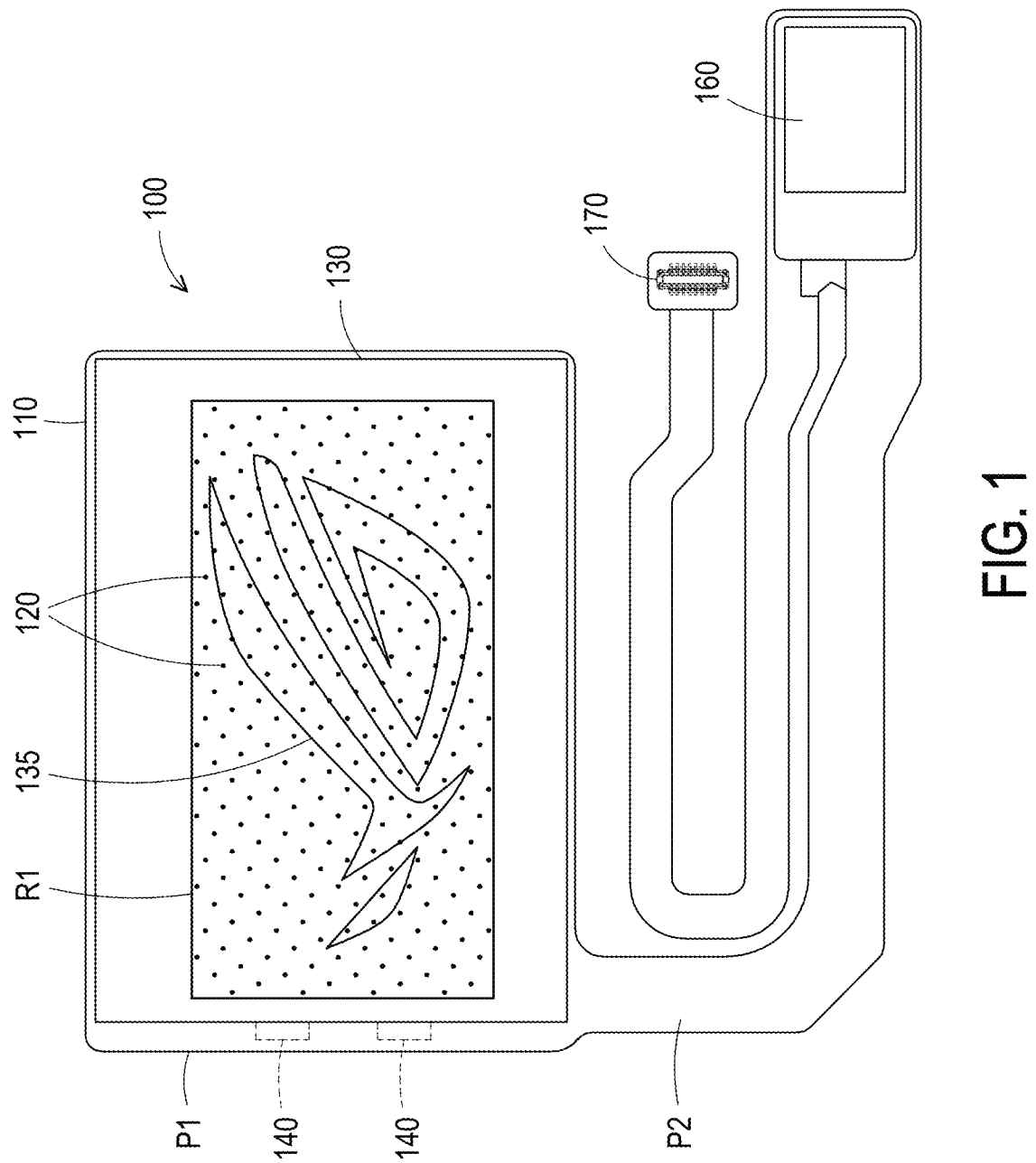
FIG. 1 is a schematic top view of a light emitting module according to an embodiment of the present disclosure.
Figures 2, 3:
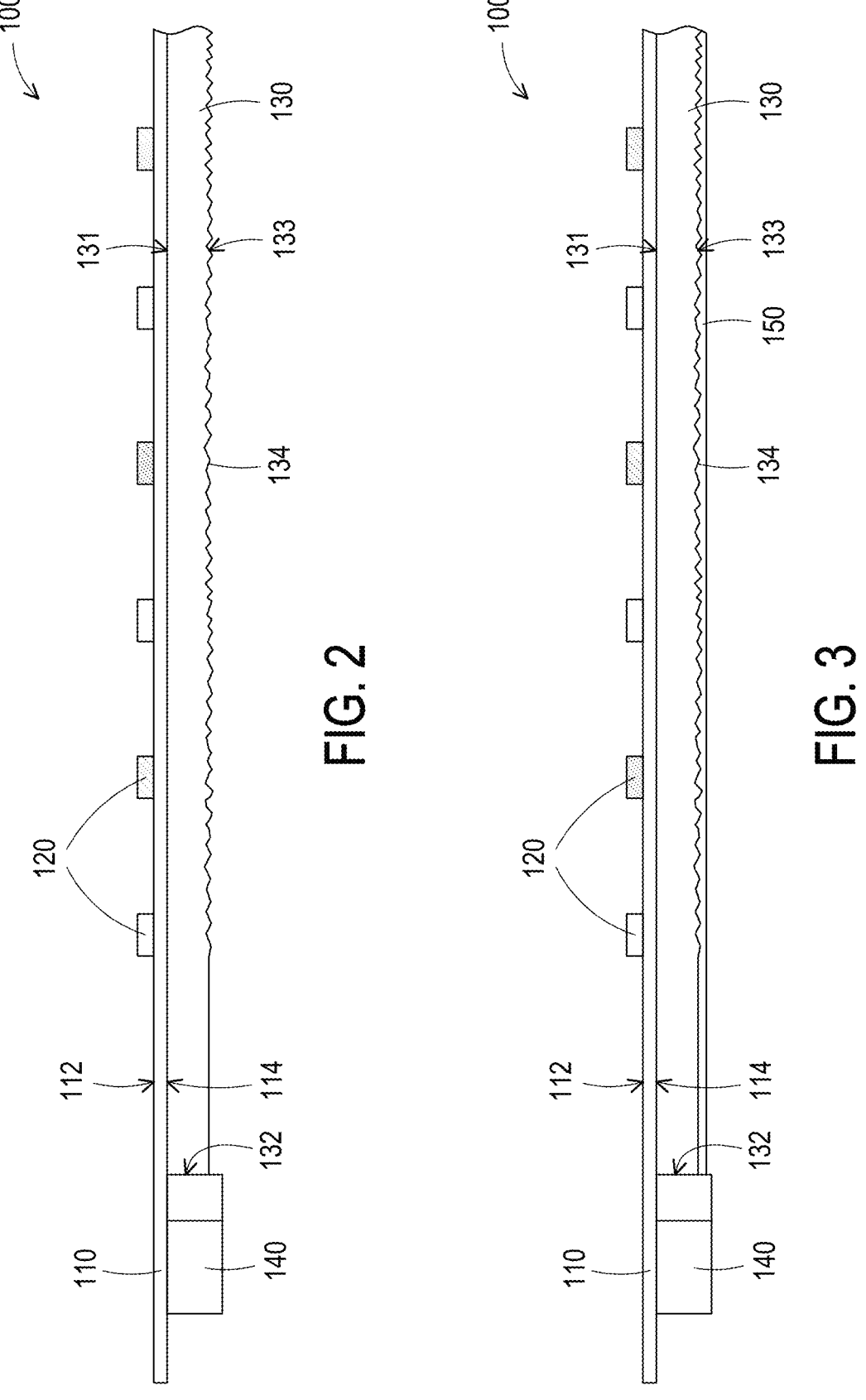
FIG. 2 is a partial cross-sectional view of a light emitting module according to an embodiment of the present disclosure.
FIG. 3 is a partial cross-sectional view of a light emitting module according to another embodiment of the present disclosure.

FIG. 1 is a schematic top view of a light emitting module according to an embodiment of the present disclosure. FIG. 2 is a partial cross-sectional view of a light emitting module according to an embodiment of the present disclosure. Referring to both FIG. 1 and FIG. 2, in some embodiments, the light emitting module 100 includes a transparent substrate 110, a plurality of first light emitting components 120, a light guide plate 130 and a plurality of second light emitting components 140. In this embodiment, the transparent substrate 110 is a flexible transparent substrate, and the material thereof may include colorless polyimide, or the like. Certainly, the disclosure is not limited thereto. In other embodiments, the transparent substrate 110 may also be a hard transparent substrate, and the material thereof may include any suitable transparent materials such as glass. The light transmittance of the transparent substrate is at least greater than about 60%. The transparent substrate 110 includes a first surface 112 and a second surface 114 opposite to each other. In some embodiments, the first surface 112 and the second surface 114 of the transparent substrate 110 include conductive circuit layers that can transmit electronic signals, the first light emitting components 120 and the second light emitting components 140 may be respectively disposed on the first surface 112 and the second surface 114 of the transparent substrate 110 by surface mount technology (SMT).

Figure 4:
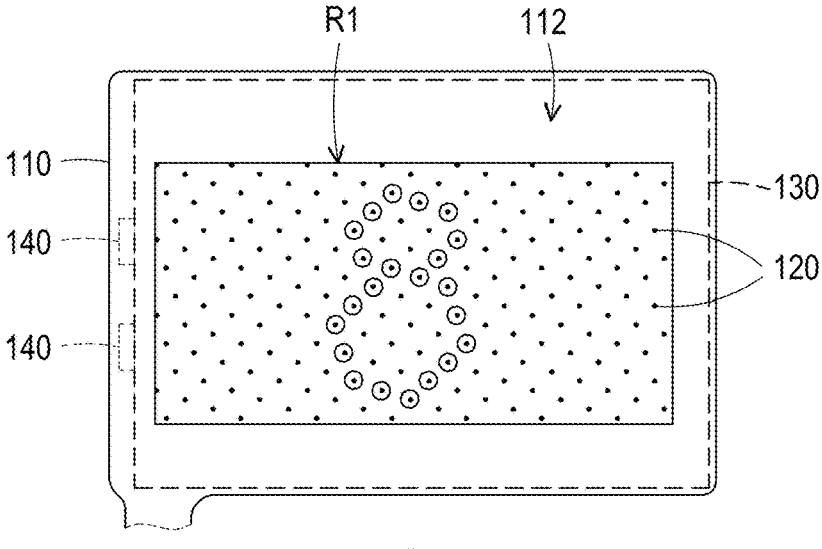
FIG. 4 is a schematic top view of a transparent substrate of a light emitting module according to an embodiment of the present disclosure.

FIG. 4 is a schematic top view of a transparent substrate of a light emitting module according to an embodiment of the present disclosure. Referring to FIG. 1 and FIG. 4, the plurality of first light emitting components 120 are arranged in an array on the first surface 112 of the transparent substrate 110 to directly display the bitmap image or text to be presented. Specifically, the first light emitting components 120 may be disposed in a component disposing region R1 of the transparent substrate 110. In this embodiment, the first light emitting component 120 may be a plurality of mini light-emitting diodes (mini LEDs), or a plurality of micro LEDs. Generally speaking, mini LED is also called "sub-millimeter light-emitting diode", which means a light-emitting diode with a die size of about 100 microns, while micro LED is about 0.1 mm smaller than mini LED. Three dies respectively with three primary colors of red (R), green (G), and blue (B) can be combined into a dot of pixel as the concept of "one pixel". In this embodiment, the first light emitting components 120 are mini LEDs, but it is not limited thereto. The first light emitting component 120 is arranged in an array on the transparent substrate 110 to drive the corresponding first light emitting components (for example, the corresponding first light emitting components 120' being illuminated are illustrated as double circles in FIG. 4) to directly display the bitmap image or text to be presented (for example, "8" is displayed by the first light emitting components 120' illustrated as a double circle in FIG. 4).

Referring to FIG. 2, in some embodiments, the light guide plate 130 and the second light emitting components 140 are disposed on the second surface 114 of the transparent substrate 110, and the light emitting surfaces of the second light emitting components 140 face the light incident side surface 132 of the light guide plate 130, so that the light emitted by the second light emitting components 140 uses the light guide plate 130 as the light guiding medium to transmit the light toward light emitting microstructures (e.g., the light emitting microstructures 134 shown in FIG. 2) of the light guide plate 130 to form a specific luminous pattern 135 with higher resolution as shown in FIG. 1. In this embodiment, the second light emitting components 140 may be light emitting diodes.

Figure 5:
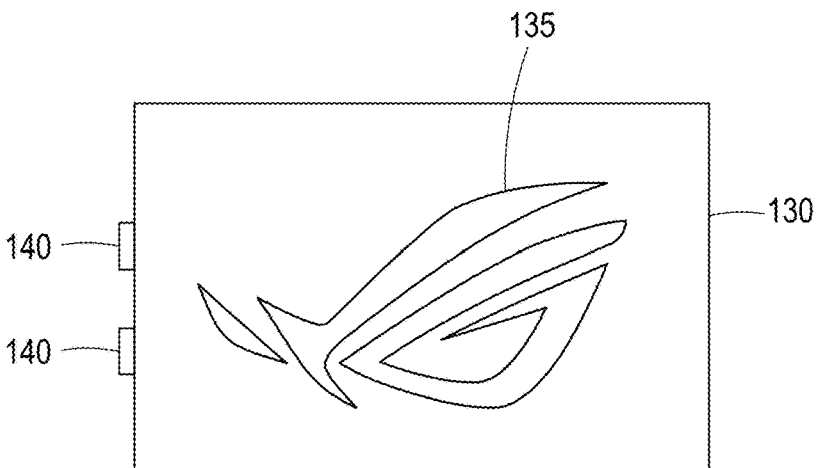
FIG. 5 is a schematic top view of a light guide plate of a light emitting module according to an embodiment of the present disclosure.

FIG. 5 is a schematic top view of a light guide plate of a light emitting module according to an embodiment of the present disclosure. Referring to FIG. 1, FIG. 2 and FIG. 5, the light guide plate 130 includes a plurality of light emitting microstructures 134, which may be distributed over an upper surface 131 and/or a lower surface 133 of the light guide plate 130. Generally speaking, the light emitting microstructure 134 is a microstructure with a special shape, for example, triangular prism lens, curvy lenticular lens, polygonal microstructure, semicircular microstructure, etc., provided on the light emitting surface of the light guide plate 130. The purpose of the above microstructure design is to break the total internal reflection phenomenon and allow light to exit. In this embodiment, the light emitting microstructures 134 are disposed on the lower surface 133 of the light guide plate 130. In this way, the light emitting microstructure 134 located on the lower surface 133 breaks the total internal reflection in the light guide plate 130, so that the light enters the light guide plate 130 from the light incident side surface 132 is guided toward the upper surface (light-emitting surface) 131 to be emitted. In this embodiment, the light emitting microstructures 134 of the light guide plate 130 are disposed on the lower surface 133 of the light guide plate 130. The contour of the footprint of the light emitting microstructures 134 can be the brand mark (logo) of the electronic device or other patterns to be displayed through the backlight. With this configuration, the light emitted by the second light emitting components 140 enters the light guide plate 130 and can be guided to the upper surface (light emitting surface) 131 of the light guide plate 130 by breaking the total internal reflection through the light emitting microstructures 134 to display a luminous brand mark (Logo) or other patterns to be displayed.

FIG. 3 is a partial cross-sectional view of a light emitting module according to another embodiment of the present disclosure. It is noted that the light emitting module shown in FIG. 3 contains many features same as or similar to the light emitting module disclosed in the previous embodiments. For purpose of clarity and simplicity, detail description of same or similar features may be omitted, and the same or similar reference numbers denote the same or like components.

Referring to FIG. 3, in this embodiment, the light emitting module 100 may further include a reflection sheet 150, which is disposed on the lower surface 133 of the light guide plate 130, such that the light entering the light guide plate 130 from the light incident side surface 132 is emitted from the lower surface 133 by breaking the total internal reflection through the light emitting microstructures 134, and is reflected upward to the upper surface (light-emitting surface) 131 by the reflection sheet, so that the light exits the light guide plate 130 through the upper surface (light emitting surface) 131 to be emitted. In one embodiment, the light emitting module 100 may further include a diffusion film, which may be located above the upper surface (light emitting surface) 131 of the light guide plate 130 to diffuse the light, so that the overall brightness of the light emitting module 100 can be distributed more evenly.

Figure 6:
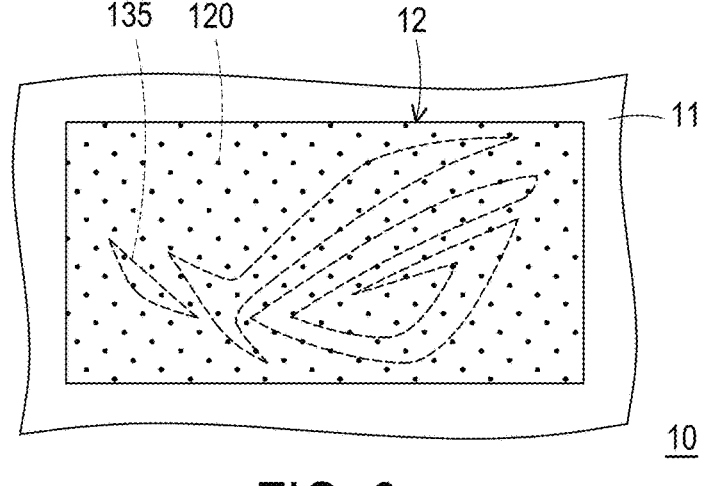
FIG. 6 is a partial top view of an electronic device having the light emitting module of FIG. 1 according to an embodiment of the present disclosure.

FIG. 6 is a partial top view of an electronic device having the light emitting module of FIG. 1 according to an embodiment of the present disclosure. Referring to both FIG. 1 and FIG. 6, in some embodiments, the light emitting module 100 can be applied to an electronic device 10. For example, the electronic device 10 can be a notebook computer, a smart phone, a tablet computer, a desktop computer, etc., and the light emitting module 100 can be disposed in the casing 11 of the electronic device, for example, the casing 11 may have a light-transmitting area 12 so that the user can see the light-emitting pattern (such as the light-emitting pattern shown in FIG. 4 and FIG. 5) presented by the light emitting module 100 through the light-transmitting area 12. From the top view, the footprint of the first light emitting components 120 overlaps the footprint of the light guide plate 130. More specifically, when viewed from the top view, the footprints of the plurality of first light emitting components 120 arranged in an array are located within the footprint of the light guide plate 130, and the array of the first light emitting components 120 may all correspond to the light-transmitting area 12 of the casing 11.

In this embodiment, the light emitting module 100 may further include a driver chip 160 coupled to the first light emitting components 120 and the second light emitting components 140. The transparent substrate 110 includes an active portion P1 and a connecting portion P2. The first light emitting components 120, the light guide plate 130 and the second light emitting components 140 are all disposed at the active portion P1, and the connecting portion P2 is connected to the active portion P1 and coupled to the driver chip 160. As such, the driver chip 160 may drive the first light emitting components 120 and the second light emitting components 140 to emit light respectively. In this embodiment, the driver chip 160 can be connected to the connector 170 via, for example, a flexible printed circuit (FPC) board, so as to be electrically connected to a component, such as a motherboard, in the electronic device 10. In one embodiment, the driver chip 160 drives the first light emitting components 120 at an illuminating timing different from an that of the second light emitting component 140. That is to say, the first light emitting components 120 and the second light emitting components 140 are not illuminated at the same time. In another embodiment, the driver chip 160 drives the first light emitting components 120 at the illuminating timing the same as that of the second light emitting component 140. That is, the first light emitting components 120 and the second light emitting components 140 are illuminated at the same time to display two different patterns simultaneously. For example, the second light emitting components 140 can display a specific luminous pattern with higher resolution through the design of the light guide plate 130, such as a brand mark (logo) or other patterns to be displayed, while the first light emitting components 120 can display changeable text or animation in bitmap form outside the area displayed luminous pattern, as described above.

For example, the driver chip 160 is configured to drive the corresponding first light emitting components 120 to emit light in a first illuminating timing, so as to display a luminous pattern or text as shown in FIG. 4, therefore, the driver chip 160 is configured to drive the corresponding first light emitting components 120 to be illuminated at the first illuminating timing, so that the light emitting module 100 is capable of switching the luminous pattern or text to be displayed upon requests by using the first light emitting component 120 arranged in an array. Moreover, the driver chip 160 is configured to drive the second light emitting components 140 to be illuminated at the second illuminating timing, so that the light emitted by the second light emitting component 140 enters the light guide plate 130 and is emitted from the upper surface 131 through the guidance of the light emitting microstructure 134 at the lower surface 133 of the light guide plate 130, so as to display a luminous pattern 135 (such as the brand mark (logo) of an electronic device or other specific patterns) with higher resolution, thereby the light emitting module 100 is capable of displaying a specific luminous pattern or text with higher resolution through the second light emitting components 140 incorporating with the light guide plate 130.

In this embodiment, the second light emitting components 140 are disposed on the same side with the light guide plate 130 as shown in FIG. 1, and can be arranged at intervals along the light incident side surface 132 of the light guide plate 130. The light emitting direction of each of the second light emitting components 140 faces the light incident side surface 132. Certainly, the disclosure is not limited thereto. The second light emitting components 140 can be disposed at any locations along a lateral direction of the light guide plate 130, so that the light enters from the side surface of the light guide plate 130.

Figure 7:
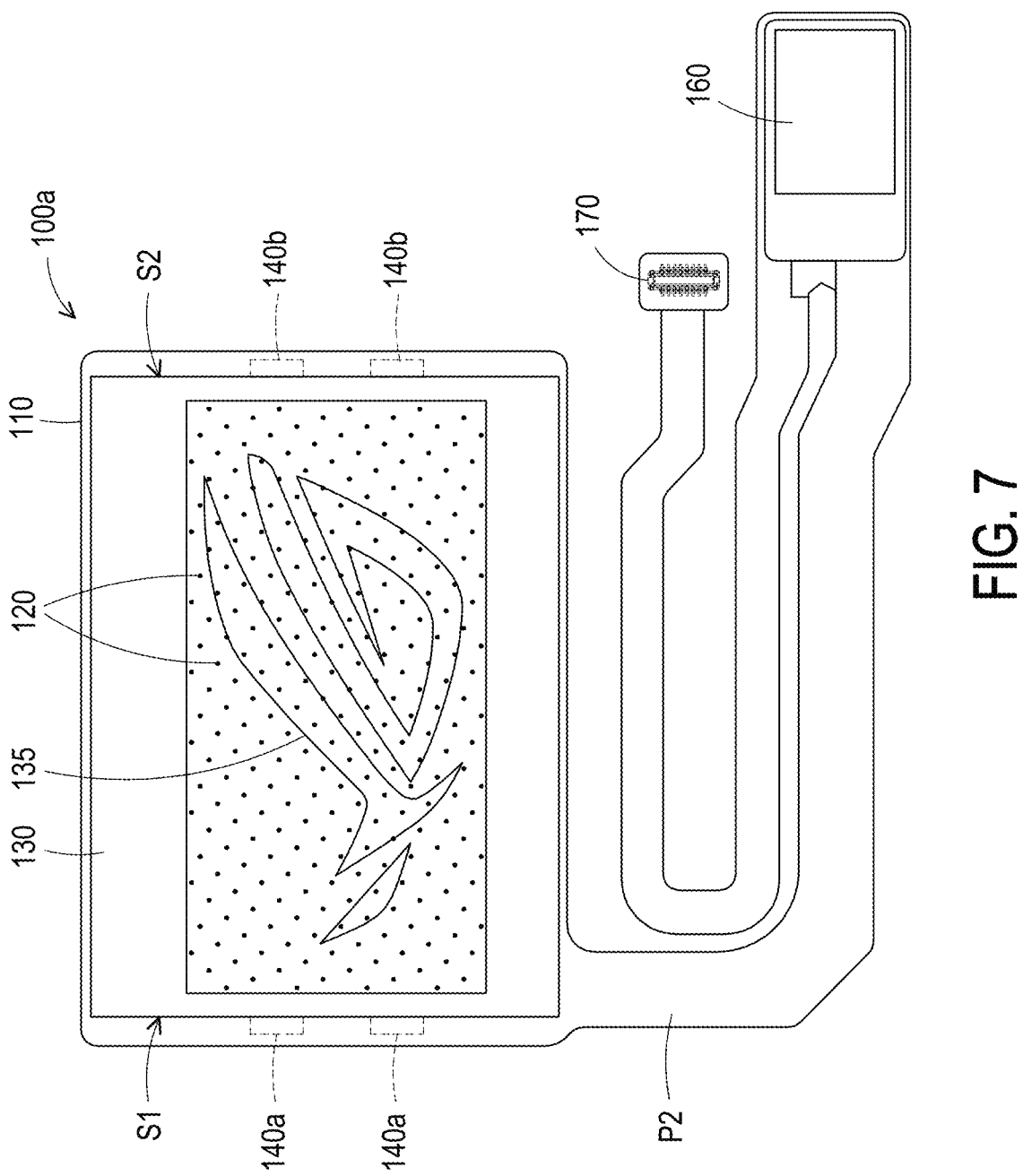
FIG. 7 is a schematic top view of a light emitting module according to another embodiment of the present disclosure.

FIG. 7 is a schematic top view of a light emitting module according to another embodiment of the present disclosure. It is noted that the light emitting module 100a of the present embodiment contains many features same as or similar to the light emitting module 100 disclosed in the previous embodiments. For purpose of clarity and simplicity, detail description of same or similar features may be omitted, and the same or similar reference numbers denote the same or like components.

Referring to FIG. 7, in this embodiment, the second light emitting components 140a and 140b may be respectively disposed on two opposite sides of the light guide plate 130, for example, the first side S1 and the second side S2, so that the light enters from the two opposite sides of the light guide plate 130. In one embodiment, the second light emitting components 140a may be disposed on the first side S1 of the light guide plate 130, and the second light emitting components 140b can be disposed on the second side S2 of the light guide plate 130, and the color of light emitted by the second light emitting components 140a is different from the color of light emitted by the second light emitting components 140b. For example, the color of the colored light emitted by the second light emitting component 140a is red, and the color of the colored light emitted by the second light emitting component 140b is blue, so that the luminous pattern is presented with red light and blue light at the same time. Therefore, with the display of different colored lights, user's visual experience can be improved and aesthetics of the electronic device using this light emitting module can be enhanced.

Figure 8:
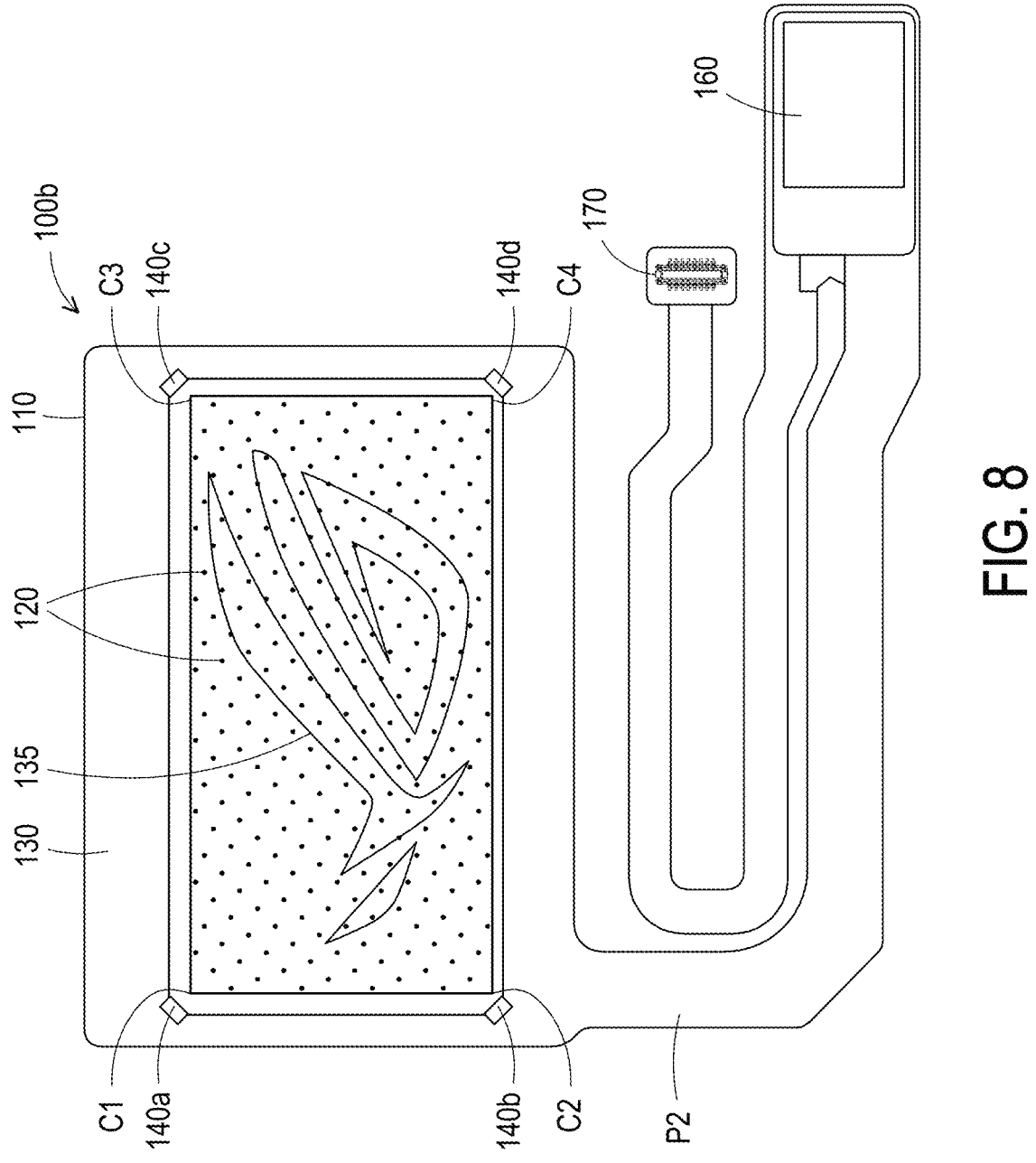
FIG. 8 is a schematic top view of a light emitting module according to yet another embodiment of the present disclosure.

FIG. 8 is a schematic top view of a light emitting module according to yet another embodiment of the present disclosure. It is noted that the light emitting module 100*b* of the present embodiment contains many features same as or similar to the light emitting module 100 disclosed in the previous embodiments. For purpose of clarity and simplicity, detail description of same or similar features may be omitted, and the same or similar reference numbers denote the same or like components.

In this embodiment, the second light emitting components 140*a*, 140*b*, 140*c*, and 140*d* can be respectively disposed at a plurality of corners (such as corners C1, C2, C3, and C4) of the light guide plate 130, so the light can enter through side surfaces of the corners of the that the light guide plate 130. In this embodiment, the light guide plate 130 is a rectangular plate structure, so the second light emitting components 140*a*, 140*b*, 140*c*, and 140*d* are respectively disposed at the four corners C1, C2, C3, and C4 of the light guide plate 130. In this embodiment, the colors of the light emitted by the second light emitting components 140*a*, 140*b*, 140*c*, and 140*d* can be different, so that the luminous pattern is presented with various colors of light at the same time. Therefore, with the display of different colored lights, user's visual experience can be improved and aesthetics of the electronic device using this light emitting module can be enhanced.

To sum up, in the light emitting module of the present disclosure, the first light emitting components are arranged in an array on the first surface of the transparent substrate while the light guide plate and the second light emitting components on the light incident side surface of the light guide plate are disposed on the second surface of the transparent substrate. With this configuration, the light emitting module can display a variety of luminous patterns or text by driving the corresponding first light emitting components to emit light. Moreover, the light emitted by the second light emitting component enters the light guide plate and exits from the upper surface of the light guide plate, so that the light emitting module can display a specific luminous pattern or text with higher resolution by incorporating the second light emitting components and the light guide plate. Therefore, the light emitting module of the present disclosure can display either a specific luminous pattern with higher resolution or a variety of light emitting patterns that can be changed upon requests, thereby enhancing the user's visual experience and improving the appearance varieties of electronic devices using this light emitting module.

What is claimed is:

1. A light emitting module, comprising:
a transparent substrate comprising a first surface and a second surface opposite to each other;
a plurality of first light emitting components arranged in an array on the first surface;
a light guide plate disposed on the second surface; and
a plurality of second light emitting components directly mounted on the second surface of the transparent substrate and facing a light incident side surface of the light guide plate, wherein when viewed from a top view, a footprint of the plurality of first light emitting components overlaps a footprint of the light guide plate.

2. The light emitting module as claimed in claim 1, wherein when viewed from a top view, a footprint of the plurality of first light emitting components are located within a footprint of the light guide plate.

3. The light emitting module as claimed in claim 1, wherein the light guide plate comprises a plurality of light emitting microstructures distributed over a lower surface of the light guide plate.

4. The light emitting module as claimed in claim 1, wherein the plurality of second light emitting components are respectively disposed on two opposite sides of the light guide plate.

5. The light emitting module as claimed in claim 1, wherein the plurality of second light emitting components are respectively disposed at a plurality of corners of the light guide plate.

6. The light emitting module as claimed in claim 1, further comprising a reflection sheet disposed on a lower surface of the light guide plate.

7. The light emitting module as claimed in claim 1, wherein the transparent substrate is a flexible transparent substrate.

8. The light emitting module as claimed in claim 1, further comprising a driver chip coupled to the plurality of first light emitting components and the plurality of second light emitting components.

9. The light emitting module as claimed in claim 8, wherein the transparent substrate comprises an active portion and a connecting portion, the plurality of first light emitting components, the plurality of second light emitting components and the light guide plate are all disposed at the active portion, and the connecting portion is connected to the active portion and coupled to the driver chip.

10. The light emitting module as claimed in claim 1, wherein the plurality of first light emitting components comprise a plurality of mini light emitting diodes (mini LEDs) or a plurality of micro LEDs, and the plurality of second light emitting components include a plurality of LEDs.

11. A light emitting module, comprising:
a transparent substrate comprising a first surface and a second surface opposite to each other;
a plurality of first light emitting components arranged in an array on the first surface;
a light guide plate disposed on the second surface; and
a plurality of second light emitting components directly mounted on the second surface of the transparent substrate and facing a light incident side surface of the light guide plate, wherein the transparent substrate is an integral transparent substrate having a light transmittance of at least greater than 60%, wherein when viewed from a top view, a footprint of the plurality of first light emitting components overlaps a footprint of the light guide plate.

12. A light emitting module, comprising:
a transparent substrate comprising a first surface and a second surface opposite to each other, wherein the transparent substrate is a flexible transparent substrate and comprising an active portion and a connecting portion extended from the active portion and connecting a driver chip;
a plurality of first light emitting components arranged in an array on the first surface of the active portion;
a light guide plate disposed on the second surface; and
a plurality of second light emitting components disposed on the second surface of the transparent substrate and facing a light incident side surface of the light guide plate.

* * * * *